United States Patent
Archan et al.

(10) Patent No.: US 9,638,264 B2
(45) Date of Patent: May 2, 2017

(54) CLUTCH

(71) Applicant: Magna Powertrain AG & Co KG, Lannach (AT)

(72) Inventors: Josef Archan, Frannach (AT); Markus Kohlböck, Ottnang a. H. (AT); Werner Schöfmann, Graz (AT)

(73) Assignee: Magna Powertrain AG & Co KG, Lannach (AT)

( * ) Notice: Subject to any disclaimer, the term of this patent is extended or adjusted under 35 U.S.C. 154(b) by 65 days.

(21) Appl. No.: 14/555,490

(22) Filed: Nov. 26, 2014

(65) Prior Publication Data
US 2015/0337906 A1 Nov. 26, 2015

(30) Foreign Application Priority Data

May 22, 2014 (DE) .................. 10 2014 209 808

(51) Int. Cl.
*F16D 48/06* (2006.01)
*F16D 11/06* (2006.01)
(Continued)

(52) U.S. Cl.
CPC .............. *F16D 11/16* (2013.01); *F16D 11/06* (2013.01); *F16D 27/102* (2013.01);
(Continued)

(58) Field of Classification Search
CPC ..... F16D 2500/1022; F16D 2500/1025; F16D 2500/70418; F16D 48/064
See application file for complete search history.

(56) References Cited

U.S. PATENT DOCUMENTS 4,977,989 A 12/1990 Ashikawa et al.
5,085,306 A 2/1992 Beigang
(Continued)

FOREIGN PATENT DOCUMENTS

CN 1910382 A 2/2007
CN 101033777 A 9/2007
(Continued)

OTHER PUBLICATIONS

Search Results dated Aug. 24, 2016 from the Chinese State Intellectual Property Office in corresponding Chinese Patent Application No. 201410680383.1.

*Primary Examiner* — Jacob S Scott
*Assistant Examiner* — Tinh Dang
(74) *Attorney, Agent, or Firm* — Dickinson Wright PLLC

(57) ABSTRACT

A clutch for a motor vehicle, preferably for engaging and disengaging a drive train for all-wheel drive vehicles, comprises a first shaft, a second shaft arranged coaxially to the first shaft, a clutch sleeve which is moveable in the axial direction relative to the first shaft and the second shaft for causing a form-fit coupling or decoupling of the first shaft and the second shaft, and a coil which can be powered, wherein a plurality of engagement bodies are connected rotationally fixedly to the first shaft, wherein the coil which can be powered is arranged coaxially to the axial direction, wherein by powering the coil, the clutch sleeve can be moved in the axial direction, wherein by moving the clutch sleeve in the axial direction, the engagement bodies can be pressed over part of their height into receivers, and wherein the receivers are connected rotationally fixedly to the second shaft.

19 Claims, 4 Drawing Sheets

(51) Int. Cl.
*F16D 11/16* (2006.01)
*F16D 27/102* (2006.01)

(52) U.S. Cl.
CPC .... *F16D 48/064* (2013.01); *F16D 2500/1022* (2013.01); *F16D 2500/1025* (2013.01); *F16D 2500/1066* (2013.01); *F16D 2500/10431* (2013.01); *F16D 2500/7041* (2013.01); *F16D 2500/70418* (2013.01)

(56) References Cited

U.S. PATENT DOCUMENTS

| | | | | |
|---|---|---|---|---|
| 5,199,541 | A | * | 4/1993 | Tobyama ............... F16D 27/112 192/113.5 |
| 5,279,402 | A | * | 1/1994 | Beigang ............. B60K 17/3505 192/103 B |
| 7,086,513 | B2 | * | 8/2006 | Bunko .................. F16D 41/088 192/113.32 |

FOREIGN PATENT DOCUMENTS

| | | | |
|---|---|---|---|
| CN | 101074706 | A | 11/2007 |
| DE | 2428916 | A1 | 1/1976 |
| DE | 3911122 | C1 | 6/1989 |
| DE | 4002053 | A1 | 7/1990 |
| GB | 1466380 | A | 3/1977 |
| JP | H02286921 | A | 11/1990 |

\* cited by examiner

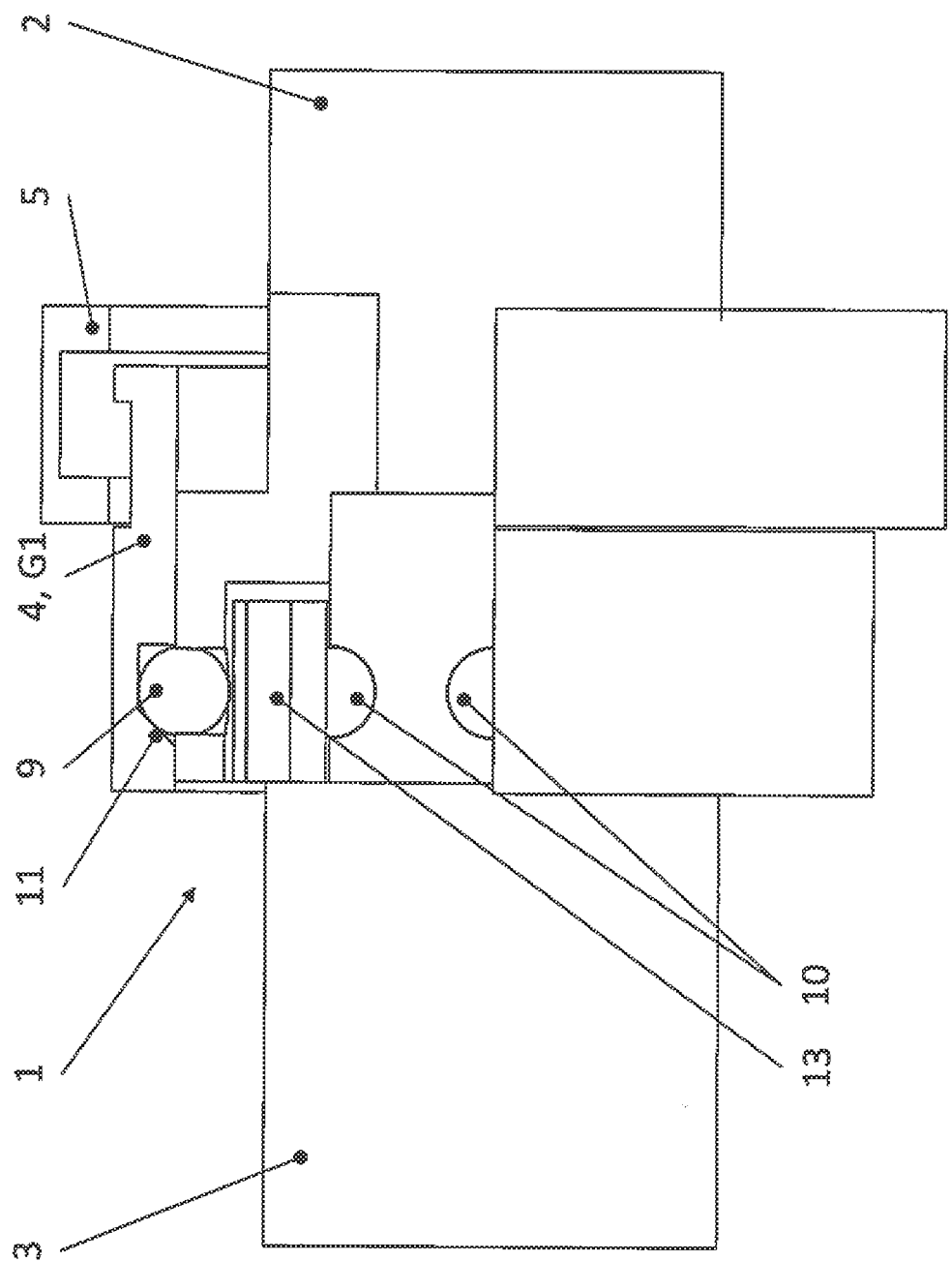

CLUTCH

CROSS-REFERENCE TO RELATED APPLICATION

This application claims priority to German Patent Application No. DE102014209808.4 filed May 22, 2014. The entire disclosure of the above application is incorporated herein by reference.

FIELD

The present invention concerns a clutch for a motor vehicle, preferably for engaging and disengaging a drive train for all-wheel drive vehicles, comprising a first shaft, a second shaft arranged coaxially to the first shaft, a clutch sleeve which can be moved in the axial direction relative to the first shaft and the second shaft and causes a form-fit coupling or decoupling of the first shaft and the second shaft, and a coil which can be powered.

BACKGROUND

This section provides background information related to the present disclosure which is not necessarily prior art.

Such clutches are known in particular in the form of so-called disconnect systems for coupling or decoupling parts of a drive train in motor vehicles in which all-wheel drive can be engaged or disengaged, so that in two-wheel drive mode, the connection between the primary axle or the drive unit on one side and the secondary axle on the other, can be at least partially disengaged. In motor vehicles with hybrid drive, during electric operation these clutches can also alternatively be used to separate the main transmission from the internal combustion engine, in order to avoid or minimise power losses and noise generation, whereby the energy consumption and hence the $CO_2$ emission can be reduced. Also however a drive train decoupling can be provided for an electric drive on the secondary axle.

DE4002053A1 describes a coupling system of the type described above in which an axial shaft can be optionally decoupled from a differential gear by means of an axially moveable shift sleeve. At idle, losses caused by the dragging of the differential gear components can thus be reduced.

DE3911122C1 describes a form-fit shift clutch, wherein the shift clutch can be used for coupling a hollow shaft with a shaft journal lying coaxially therein, in which by axle movement of a shift sleeve, coupling balls can be pressed into form-fit engagement between carriers in the shaft journal and orifices in the hollow shaft, and by axial movement of a blocking sleeve, blocking balls can be pressed radially into an annular groove in axially form-fit engagement of the hollow shaft in relation to the shift sleeve. The shift clutch has a coil carrier formed coaxially to the shaft, with a holding winding and a shift winding, wherein the shift winding is powered to couple a shift ring to a rotating shaft. The holding winding, which generates a weaker magnetic field than the shift winding, is powered to hold the shift ring in its position.

SUMMARY OF THE INVENTION

This section provides a general summary of the disclosure and is not intended to be considered a comprehensive disclosure of its full scope or all of its objects and features.

The object of the invention is to provide such a clutch in an improved form relative to the known solutions, which is constructed firstly economically and secondly compactly, with simultaneously higher functional reliability.

This object is achieved by a clutch for a motor vehicle, preferably for engaging and disengaging a drive train for all-wheel drive vehicles, comprising a first shaft, a second shaft arranged coaxially to the first shaft, a clutch sleeve which is moveable in the axial direction relative to the first shaft and the second shaft and can cause a form-fit coupling or decoupling of the first shaft and the second shaft and a coil which can be powered.

The object is achieved by a clutch for a motor vehicle, preferably for engaging and disengaging a drive train for all-wheel drive vehicles, comprising a first shaft, a second shaft arranged coaxially to the first shaft, a clutch sleeve which is moveable in the axial direction relative to the first shaft and the second shaft, and causes a form-fit coupling or decoupling of the first shaft and the second shaft, and a coil which can be powered, wherein a plurality of engagement bodies is connected rotationally fixedly to the first shaft, wherein the coil which can be powered is arranged coaxially to the axial direction, wherein by powering the coil, the clutch sleeve can be moved in the axial direction, wherein by moving the clutch sleeve in the axial direction, the engagement bodies can be pressed over part of their height into receivers, wherein the receivers are connected rotationally fixedly to the second shaft.

According to the invention, a clutch sleeve is arranged between the first shaft and the second shaft and is provided for connecting and/or separating the two shafts.

The clutch sleeve is movable in the axial direction of the two axially arranged shafts, wherein the engagement bodies can be pressed into receivers so that the first shaft and the second shaft are connected together by form fit.

In connection with the present invention, the directional references "axial" and "radial" always refer to the axial direction of the two shafts.

In the description which follows, the term "system" means the clutch according to the invention.

The clutch sleeve can be activated by means of a coil which can be powered. The coil is arranged in a ring shape coaxially to the two shafts. This solution allows a particularly compact construction of the clutch.

In its base position, the clutch sleeve can be either closed or open, depending on whether the system required is to be coupled or decoupled in the base position.

In one embodiment according to the invention, the clutch sleeve is arranged rotationally fixedly to the first shaft. This allows a particularly simple and hence economic construction of the clutch, with increased functional reliability compared with clutches which only create a rotationally fixed connection when necessary.

In a preferred embodiment, the receivers are formed integrally with the second shaft, wherein the receivers are distributed evenly over the circumference of the second shaft. The engagement bodies are preferably pressed up to almost half their height in the receivers, wherein the receivers have a suitable shape for receiving the engagement bodies in order to achieve a reliable form-fit connection.

According to the invention, the engagement bodies are arranged in a non-engagement position on the first shaft. The non-engagement position exists when the clutch sleeve is in a base position.

According to the invention it is also possible for the engagement bodies to be in the engagement position when the clutch sleeve is in an end position.

For ease of understanding, a preferred embodiment is described below.

The engagement bodies arranged on the first shaft are held in a carrier formed in the manner of a cage, as is normal for roller bearings for example. In this way the engagement bodies are distributed with definition from each other about the circumference of the twistable sleeve.

According to the invention, the cage may be formed on the clutch sleeve, wherein the clutch sleeve must be connected rotationally fixedly to the first shaft.

In an alternative embodiment, the cage is formed on the first shaft, wherein the cage and the first shaft are preferably formed integrally. The clutch sleeve in this embodiment may be formed twistable in relation to the first shaft. In this embodiment, the clutch sleeve has a circumferential ramp or cone.

The circumferential ramp is here formed in an inner face of a bore of the clutch sleeve which is produced coaxially to the axial direction, wherein the diameter of the bore of the clutch sleeve corresponds to the diameter in the region of the cage of the first shaft.

The circumferential ramp may be formed geometrically such that it has for example two or more slopes. This constitutes a limitation of moment, whereby the clutch acts as a safety clutch since, when the torque on the two shafts increases, because of the outwardly propulsive forces, for example centrifugal forces, the engagement bodies are pressed against the slope of the circumferential ramp, whereby the clutch sleeve is moved in the axial direction, causing a separation between the two shafts. Because of the centrifugal forces, an engagement safety limited by rotation speed can be achieved.

In a preferred embodiment, the carriers are formed integrally with the first shaft. Since the engagement bodies are held in position by a cage, in principle the engagement bodies engage simultaneously in the receivers, whereby the forces effective on engagement are distributed evenly over each engagement body.

In an alternative embodiment of the invention, the clutch sleeve which can be moved in the axial direction engages in a twistable sleeve distinct from the clutch sleeve. The twistable sleeve is substantially formed such that it allows a twist about the axis extending in the axial direction. In a preferred embodiment, this twistable sleeve is arranged coaxially to the second shaft.

In a preferred embodiment, the clutch sleeve can engage in the twistable sleeve via a plurality of end ramps. Here, in an embodiment according to the invention, on a second end the clutch sleeve can have wedges which protrude in the axial direction while the twistable sleeve has corresponding depressions.

The formation of the end ramps in the axial direction means that because of the steep flanks, on a relatively large movement in the axial direction, a relatively small twist of the twistable sleeve takes place. The end ramps are however configured such that on a complete movement of the clutch sleeve in the axial direction, the desired twist of the twistable sleeve is achieved.

Alternatively, claws could be considered wherein the clutch sleeve and the twistable sleeve each have end claw elements which engage in each other.

According to the invention, on engagement of the end ramps, the twistable sleeve executes a twist.

The twisting of the twistable sleeve can be facilitated if a friction surface is arranged between the second shaft and the twistable sleeve. As soon as the clutch sleeve presses the twistable sleeve in the direction of the friction surface of the second shaft, said sleeve is twisted because of the friction surface until the engagement bodies are pressed into the receivers of the second shaft.

The end ramps of the clutch sleeve and the twistable sleeve are configured running in the circumferential direction, in particular the end ramps are distributed evenly about the respective circumference. The end ramps of the clutch sleeve and the twistable sleeve are arranged running in opposite directions.

In this embodiment, the engagement bodies are arranged in individual ramps formed in the twistable sleeve. The engagement bodies are here also received in a carrier configured in the manner of a cage, arranged in a non-engagement position. The non-engagement position is reached when the clutch sleeve is in the base position.

On movement of the clutch sleeve in the axial direction, the engagement bodies are pressed radially into receivers of the second shaft by a plurality of ramps in the twistable sleeve.

The sloping faces of the ramps in the twistable sleeve are oriented substantially in the circumferential direction of the twistable sleeve, wherein in particular the number of ramps corresponds to the number of engagement bodies.

Preferably balls or rollers are used as engagement bodies. However engagement bodies with other geometries can also be used. The geometry of the engagement bodies however influences the surface pressure of the engagement bodies.

The two shafts are separated when the clutch sleeve returns to the base position, wherein the engagement bodies are lifted out of the receivers by the centrifugal forces of the rotating shafts. If the centrifugal forces are too small because the rotation speed of the shafts is too low, springs can also be provided which press the engagement bodies out of the receivers.

In a preferred embodiment, the clutch sleeve has a gate track at least in portions on the outer circumference. The gate track at least in the axial direction has a portion which corresponds at least to the desired axial movement length of the clutch sleeve.

It is naturally also possible for the gate pin to be arranged in the clutch sleeve and the gate in the first shaft.

Alternatively, instead of a gate, a push-fit or serrations can be provided. The shaft portion of the first shaft and the clutch sleeve here, at least in portions, have toothing which connects the first shaft and the clutch sleeve together rotationally fixedly.

According to the invention, one or more springs are provided coaxially to the axial direction, which bring the clutch sleeve into the base position, the coupled or decoupled position depending on how the system is configured.

Here the at least one spring rests at a first end on the first shaft, via a stop arranged on the first shaft. At the second end, the spring rests against a first face of the clutch sleeve and presses this into the base position when the coil is not powered. The first face of the clutch sleeve faces the stop of the first shaft.

In one embodiment according to the invention, the at least one spring is arranged rotationally fixedly to the first shaft.

It must be stated that, as an alternative to powering the coil, pneumatic or hydraulic actuation devices may also be used. The clutch sleeve can be moved by pressurising a face, which acts as a piston face, under the building pressure of a suitable medium.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The invention is described as an example below with reference to the drawings.

FIG. 1 shows a simplified side view of a clutch according to one embodiment of the invention, wherein the clutch is in the base position.

DETAILED DESCRIPTION OF THE INVENTION

Figure 3:
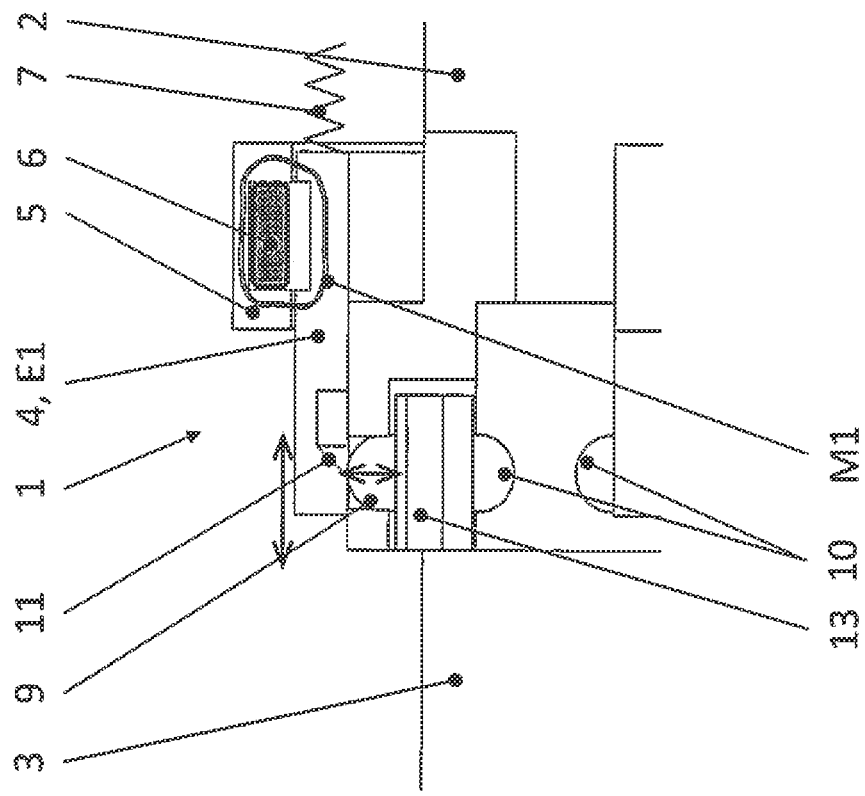
FIG. 3 is a further side view of the clutch according to FIG. 1, wherein the clutch sleeve is in the end position.

A simplified side view of a clutch 1 constructed according to the invention is shown in FIG. 1. The clutch 1 substantially comprises a first shaft 2, a second shaft 3 and a clutch sleeve 4. Engagement bodies 9 are arranged in the clutch sleeve and are provided to engage in receivers 13 of the second shaft 3. A housing (not shown) accommodating the clutch 1 is provided to mount a coil holder 5 rotationally fixedly. In the coil receiver 5, a coil 6 (not shown) is arranged coaxially to the axial direction. The engagement bodies 9, preferably balls, are received in carriers 10 in the manner of a cage, as known from roller bearings, in the first shaft 2. In a base position G1 of the clutch sleeve 4, i.e. when the coil 6 is not powered, the two shafts 2, 3 are separated i.e. the system is open.

Figure 2:
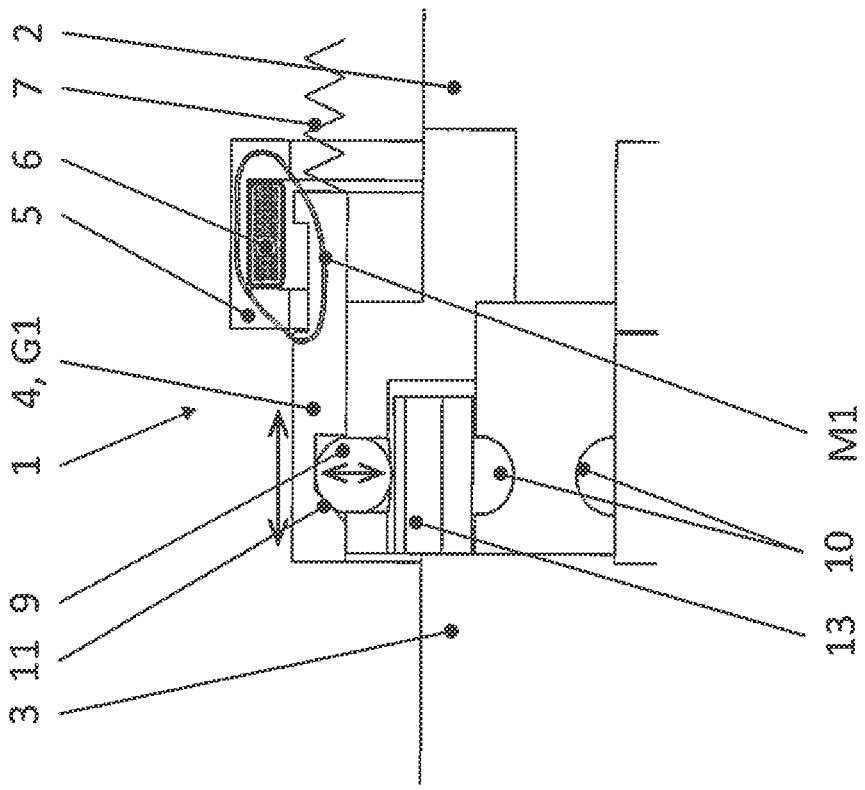
FIG. 2 is a further side view of the clutch according to FIG. 1, wherein the clutch sleeve is in the base position.

As shown in FIGS. 2 and 3, when the coil 6 is powered, the clutch sleeve 4 is drawn in a closing direction from the base position G1 toward an end position E1 by the force of the magnetic field, generated by the magnetic flux M1, against the spring force of a spring 7. The magnetic flux M1 runs between the coil holder 5, mounted rotationally fixedly, and the rotating clutch sleeve 4. The magnetic flux M1 initially has a smaller magnetic force since the clutch sleeve 4 is spaced from the coil holder 5, which distorts the magnetic field. The clutch sleeve 4 is configured such that on an inside it has a groove defining a circumferential ramp 11 or cone, by means of which the engagement bodies 9 within the carriers 10 can be pressed radially into the receivers 13 of the second shaft 3. The clutch sleeve 4 according to the invention executes a movement in the axial direction, wherein at least one gate pin 14 is provided in the first shaft 2 and a gate 15 (not shown) corresponding to the gate pin 14 is provided in the clutch sleeve 4, preventing a twist of the clutch sleeve 4 and limiting the movement in the axial direction.

FIG. 3 shows the clutch sleeve 4 in the end position E1, whereby the engagement bodies 9 are pressed completely into the receivers 13 by the circumferential ramp 11 formed in the clutch sleeve 4, in an engagement position whereby the two shafts 2, 3 are connected and the system is closed. The clutch sleeve 4 is held in the end position E1 by the force of the magnetic field, wherein the magnetic flux M1 reaches a maximum force since the coil holder 5 and the clutch sleeve 4 have a minimum distance from each other, whereby the magnetic field reaches its greatest level. When the coil 6 is no longer powered, the clutch sleeve 4 is moved back into the base position G1 by the spring 7, which is arranged coaxially to the axial direction on the first shaft 2 and which at one end rests on a stop (not shown) of the first shaft 2 and at the other end against the first face of the clutch sleeve 4. The spring 7 is arranged rotationally fixedly to the first shaft 2. The engagement bodies 9 are pressed outward by the centrifugal forces, or if these are too small because the shafts are rotating too slowly, by the springs arranged in the receivers 13 (not shown), whereby the system is open as shown in FIG. 2.

Figure 4:
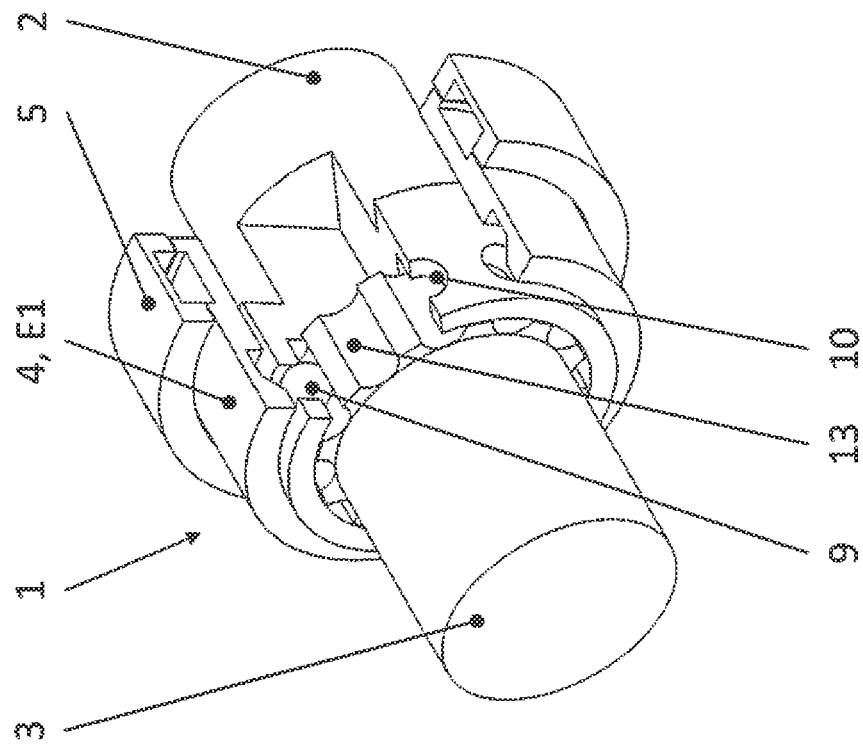
FIG. 4 shows a perspective view of a clutch according to FIG. 1, wherein the clutch is in the base position.
Figure 5:
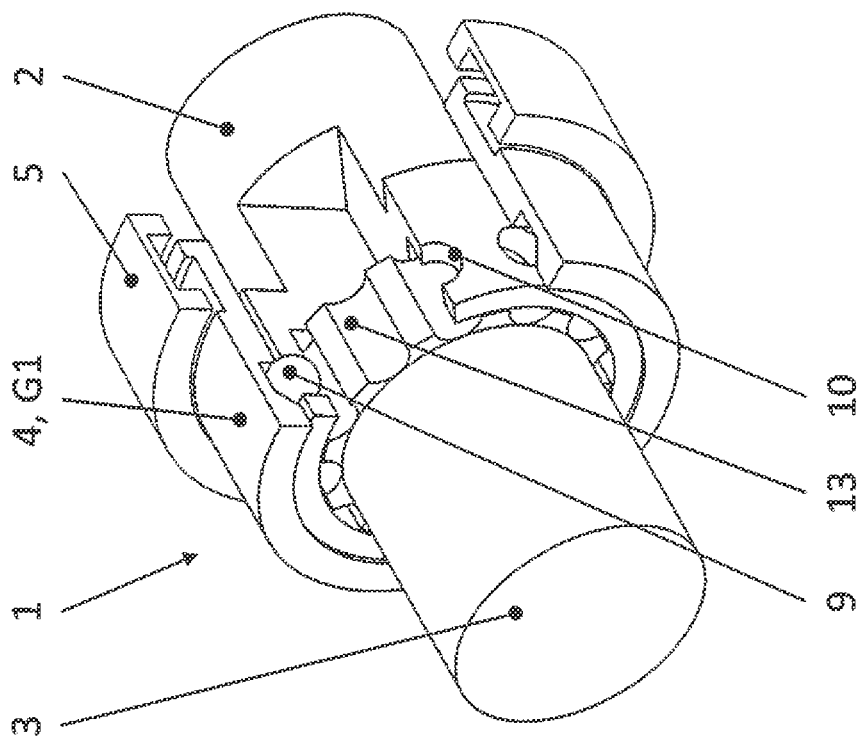
FIG. 5 shows a perspective view of a clutch according to FIG. 1, wherein the clutch is in the end position.

In FIGS. 4 and 5, the clutch 1 is shown in perspective view according to FIG. 1 and FIGS. 2, 3 respectively. In FIG. 4 the clutch 1 is open, in FIG. 5 the clutch 1 is closed. The coil 6 and the spring 7 are not shown. The receivers 13 are configured such that the engagement bodies 9 can be pressed into the receivers 13 and out again without great force.

Figure 6:
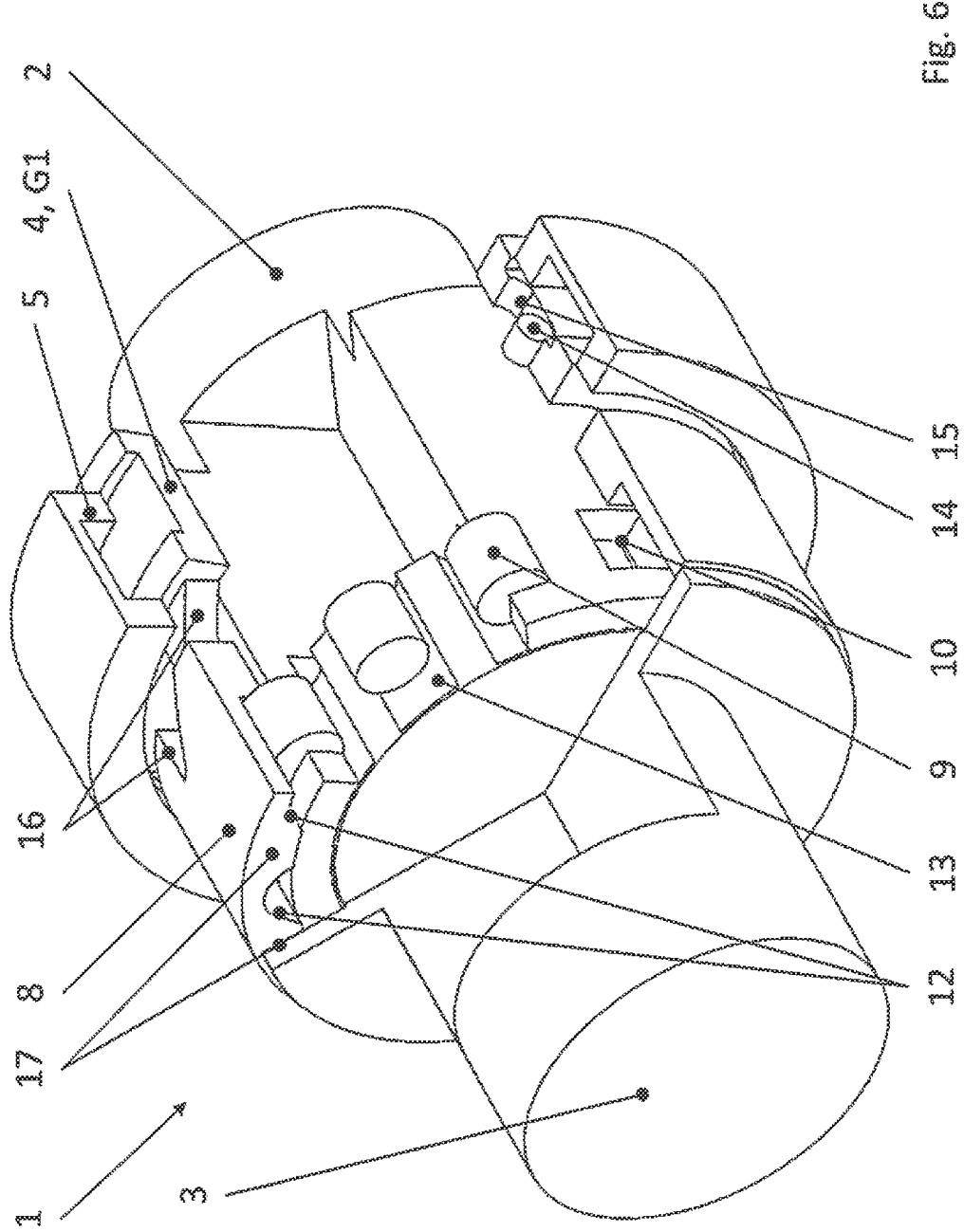
FIG. 6 shows a perspective view of an alternative embodiment of the clutch.

An alternative embodiment is shown in perspective in FIG. 6. In this variant, a twistable sleeve 8 which is distinct from the clutch sleeve 4 is arranged on the first shaft 2. The clutch sleeve 4 and the twistable sleeve 8 have mutually opposing end ramps 16 which engage in each other when the clutch sleeve 4 moves in the axial direction, wherein the end ramps 16 are arranged on a second face of the clutch sleeve 4. The engagement of the end ramps 16 of the clutch sleeve 4 in the opposing end ramps 16 of the twistable sleeve 8 causes the twistable sleeve 8 to twist, whereby the engagement bodies 9, which in this embodiment are arranged in individual ramps 12 formed in the twistable sleeve 8 and are configured as rollers, are pressed into receivers 13 formed in the second shaft 3 into an engagement position. According to the invention, mutually facing friction surfaces 17 are arranged between the twistable sleeve 8 and the second shaft 3, which should shorten the time required for engagement of the engagement bodies 9 in the receivers 13 of the second shaft 3. The engagement bodies 9 are mounted in carriers 10 of the first shaft 2. The plurality of circumferentially spaced ramps 12 are formed in twistable sleeve 8 and function to radially depress engagement bodies 9 into receivers 13 in response to axial movement of clutch sleeve 4 moving from its base position G1 into its end position E1. Such axial movement of clutch sleeve 4, due to powering of coil 6, causes engagement of end ramps 16 which, in turn, causes twistable sleeve 8 to circumferentially index such that ramps 12 move engagement bodies 9 radially inwardly. FIG. 6 shows axially moveable clutch sleeve 4 and twistable sleeve 8 positioned to establish the open mode of clutch 1 when clutch sleeve 4 is in its base position G1. A gate pin 14 is arranged in the first shaft 2 and engages in a corresponding gate 15 of the clutch sleeve 4. According to the invention, several gate pins 14 and gates 15 can be provided, in order for example to minimise the surface pressure or prevent tilting of the gate pin 14 in the gate 15 on longitudinal movement. The gate 15 here has a longitudinal slot, viewed in the axial direction, of defined length which defines the movement of the clutch sleeve 4 in the axial direction.

The foregoing description of the embodiments has been provided for purposes of illustration and description. It is not intended to be exhaustive or to limit the disclosure. Individual elements or features of a particular embodiment are generally not limited to that particular embodiment, but where applicable, are interchangeable and can be used in a selected embodiment, even if not specifically shown or described. The same may also be varied in many ways. Such variations are not to be regarded as a departure from the disclosures, and all such modifications are intended to be included within the scope of this disclosure.

LIST OF REFERENCE NUMERALS

1 Clutch
2 First shaft
3 Second shaft
4 Clutch sleeve
5 Coil holder
6 Coil
7 Spring
8 Sleeve
9 Engagement body
10 Carrier
11 Circumferential ramp
12 Ramps
13 Receiver
14 Gate pin
15 Gate
16 End ramps
17 Friction surface
E1 End position
G1 Base position
M1 Magnetic flux

The invention claimed is:

1. A clutch for a motor vehicle, preferably for engaging and disengaging a drive train for all-wheel drive vehicles, comprising a first shaft, a second shaft arranged coaxially to the first shaft along an axis, a clutch sleeve extending axially between a first end and a second end, wherein the clutch sleeve defines a circumferential groove presenting a ramp adjacent to the first end, and wherein the clutch sleeve is moveable in the axial direction relative to the first shaft and the second shaft, and wherein the clutch sleeve can cause a form-fit coupling or decoupling of the first shaft and the second shaft, and a coil which can be powered and is disposed axially adjacent to the second end of the clutch sleeve and axially spaced from the groove, wherein a plurality of engagement bodies is connected rotationally fixedly to the first shaft, wherein the coil which can be powered is arranged coaxially to the axial direction, wherein by powering the coil, the clutch sleeve can be moved in the axial direction, wherein by moving the clutch sleeve in the axial direction, the ramp of the groove radially presses the engagement bodies into a plurality of receivers extending axially along the second shaft to radially couple the first shaft and the second shaft.

2. The clutch according to claim 1, wherein the clutch sleeve is arranged rotationally fixedly to the first shaft.

3. The clutch according to claim 1, wherein the receivers are formed integrally with the second shaft.

4. The clutch according to claim 1, wherein the engagement bodies are arranged in a non-engagement position on the first shaft.

5. The clutch according claim 1, wherein the engagement bodies are held in a carrier formed in the manner of a cage.

6. The clutch according to claim 1, wherein each of the plurality of receivers has a channel shape.

7. The clutch according to claim 1, wherein the clutch sleeve which can be moved in the axial direction can engage on a twistable sleeve distinct from the clutch sleeve.

8. The clutch according to claim 7, wherein the clutch sleeve can engage in the twistable sleeve via a plurality of end ramps.

9. The clutch according to claim 7, wherein the clutch sleeve and the twistable sleeve can be connected together rotationally fixedly by engagement of the end ramps.

10. The clutch according to claim 9, wherein the twistable sleeve executes a twist on engagement of the end ramps.

11. The clutch according to claim 7, wherein the engagement bodies are arranged on the twistable sleeve.

12. The clutch according to claim 7, wherein on movement of the clutch sleeve in the axial direction, the engagement bodies can be pressed radially into receivers on the second shaft by a plurality of ramps in the twistable sleeve.

13. The clutch according claim 7, wherein the sloping faces of the ramps in the twistable sleeve are oriented substantially in the circumferential direction of the twistable sleeve wherein in particular the number of ramps corresponds to the number of engagement bodies.

14. The clutch according to claim 1, wherein the engagement bodies are balls or rollers.

15. The clutch according to claim 1, wherein the clutch sleeve has an inner surface defining the groove, and wherein the inner surface extends substantially axially between the groove and the first end of the clutch sleeve.

16. The clutch according to claim 1, wherein the clutch sleeve can be brought into a coupled or decoupled base position by a spring arranged coaxially to the axial direction.

17. The clutch according to claim 1, wherein the coil is axially spaced from the plurality of engagement bodies.

18. The clutch according to claim 1, wherein the groove of the clutch sleeve extends axially over the entire axial length of each of the engagement bodies.

19. A clutch for a motor vehicle comprising:
a first shaft and a second shaft disposed coaxially with one another along an axis;
a plurality of receivers rotationally fixed to and extending axially along the second shaft;
a plurality of engagement bodies rotationally fixed to the first shaft and each disposed in axial alignment with one of the receivers;
a clutch sleeve disposed about the first and second shafts and extending axially between a first end and a second end and axially moveable relative to the first and second shafts;
the clutch sleeve defining a circumferential groove presenting a ramp adjacent to the first end and axially overlying the plurality of engagement bodies, and wherein the clutch sleeve is axially moveable between a base position and an end position, wherein the ramp of the groove is spaced from the engagement bodies when the clutch sleeve is in the base position, and wherein the ramp of the groove radially presses the engagement bodies into the axially extending receivers by at least part of their height when the clutch sleeve is in the end position to radially connect the first and second shafts to one another;
a spring biasing the clutch sleeve toward the base position; and
a coil disposed axially adjacent to the second end of the clutch sleeve and axially spaced from the groove, wherein the coil is configured to move the clutch sleeve into the end position when the coil is powered.

* * * * *